United States Patent [19]

Derby et al.

[11] Patent Number: 5,790,137
[45] Date of Patent: Aug. 4, 1998

[54] SYSTEM AND METHOD FOR USING A FRAME BUFFER IN CACHED MODE TO INCREASE BUS UTILIZATION DURING GRAPHICS OPERATIONS

[75] Inventors: Herbert G. Derby, Boulder Creek; Thomas E. Dowdy, Sunnyvale, both of Calif.

[73] Assignee: Apple Computer, Inc., Cupertino, Calif.

[21] Appl. No.: 538,725

[22] Filed: Oct. 5, 1995

[51] Int. Cl.[6] .................................................. G06F 12/00
[52] U.S. Cl. ........................................ 345/509; 711/113
[58] Field of Search ............................. 395/800, 525, 395/502, 200.03, 164, 509

[56] References Cited

U.S. PATENT DOCUMENTS

| | | | |
|---|---|---|---|
| 5,471,592 | 11/1995 | Gove et al. | 395/200.03 |
| 5,493,644 | 2/1996 | Thayer et al. | 395/502 |
| 5,493,646 | 2/1996 | Guttag et al. | 395/525 |
| 5,522,083 | 5/1996 | Gove et al. | 395/800 |
| 5,524,265 | 6/1996 | Balmer | 395/800 |

*Primary Examiner*—Tod R. Swann
*Assistant Examiner*—David Langjahr
*Attorney, Agent, or Firm*—Sawyer & Associates

[57] ABSTRACT

A system and method for increasing utilization of a system bus and frame buffer throughput in a graphic display system. The frame buffer is changed from cache inhibited mode to cached mode in order to take advantage of the burst mode of system bus in which a plurality of values are transferred to the frame buffer following one address. Data coherency is maintained between the cache and the frame buffer by invalidating a cache-line before writing to the cache-line, and by explicitly flushing the cache-line after the cache-line is filled with data.

22 Claims, 5 Drawing Sheets

1

SYSTEM AND METHOD FOR USING A FRAME BUFFER IN CACHED MODE TO INCREASE BUS UTILIZATION DURING GRAPHICS OPERATIONS

The present invention relates to a method for using a frame buffer in cached mode, and more particularly to a method for improving the utilization of a system bus during graphics operations.

BACKGROUND OF THE INVENTION

Graphic display systems typically comprise a processor, a frame buffer, and a display screen. The frame buffer is a large contiguous portion of computer memory for storing the object to be displayed as a series of binary values. The process of converting the object stored in the frame buffer to the display pattern of the screen is call scan-conversion. The rate at which scan conversion is performed varies from system to system. Frequently, however, a minimum refresh or repetition rate of at least 24 frames per second is required for real-time video. This means that the rate at which the processor updates the images to be displayed in the frame buffer must be at least as fast as the screen refresh rate.

Traditionally, the processor updates the values in the frame buffer one word of data at time via a system bus. When a data word is transmitted to the frame buffer on the bus, it is accompanied by an address specifying the storage location in the frame buffer. Transferring one data word with one address over the bus utilizes only fifty percent of the bus data capacity, since there is a one-to-one correspondence between a data word and an address. This under utilization of the bus limits the speed at which the processor can update of the frame buffer, limiting rendering rates.

Accordingly, what is needed is a way to increase data transfer from a processor to a frame buffer. The present invention addresses such a need.

SUMMARY OF THE INVENTION

The present invention provides a method and system for increasing utilization of a system bus in a graphic display system in which a processor writes a plurality of data values into a first buffer at respective address locations, the processor includes a cache that has at least one cache-line. The method and system further comprises placing the first buffer in cached mode, writing the plurality of data values into the cache-line, and flushing the cache-line, whereby data coherency is maintained and data throughput to the first buffer is increased.

According to the system and method disclosed herein, the present invention increases utilization of the system bus twenty-to-seventy percent, thereby increasing overall system performance.

DESCRIPTION OF THE INVENTION

The present invention relates to an improvement in graphics processing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
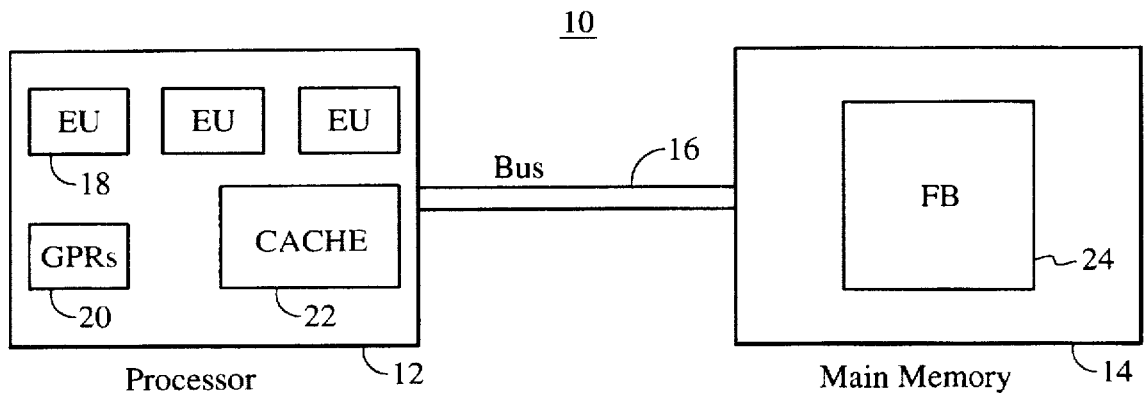
FIG. 1 is a block diagram of a graphics processing system in which the present invention operates.

FIG. 1 is a block diagram of a graphics processing system 10 in which the present invention operates. The graphic processing system 10 includes a processor 12 and a main memory 14 connected by a system bus 16. The processor 12 contains several execution units 18 as the main processing elements, general purpose registers 20 (GRPs), and a cache 22 to speed access to main memory 14. The coordination between the processor 12, the cache 22, and the main memory 14 typically operates as follows.

When a read request is issued by the processor 12 during the execution of a program, the contents of a block of memory words stored at the location specified are transferred from main memory 14 into the cache 22 one word at a time. When any of the locations in this block is referenced by the program, the contents of the block are read from the cache 22. When the cache 22 is full and a memory word is referenced that is not in the cache 22, the oldest block in the cache 22 is removed to make room for the block containing the referenced word.

When a write request is received from the processor 12, it is determined if the word to be written into main memory 14 is present in the cache 22. If so, then the location in the cache 22 containing the word is updated. Subsequently, when the block containing the word is removed from the cache 22 to make room for a new block, the permanent location in main memory 14 for the word is updated.

Figure 2:
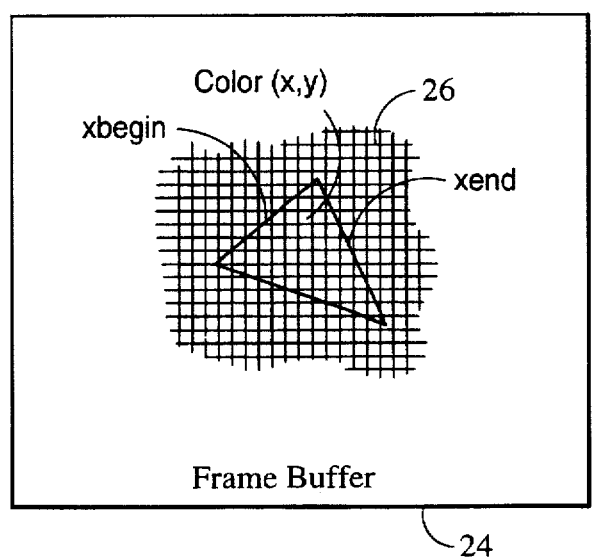
FIG. 2 is a pictorial representation depicting the frame buffer 24.

As shown, a section of the main memory 14 includes a frame buffer 24. FIG. 2 is a block diagram depicting the frame buffer 24. The frame buffer 24 is an array of (x, y) coordinates 26 corresponding to pixels on a display screen. The frame buffer 24 is shown here storing the image of a triangle. At each (x,y) coordinate 26 in the frame buffer 24, the intensity or color of the point is stored.

Each horizontal row of a polygon, which is called a scan-line, is defined by a beginning x-coordinate, shown as xbegin, and an ending x-coordinate, shown as xend. The intensity values for each point in the scan-line are written to the frame buffer 24 in sequential memory locations. Typically, the intensity values for each point are represented by a four-byte data word.

Although the cache 22 is generally used to speed memory accesses, conventional scan-conversion processes have traditionally used the frame buffer 24 in cache inhibited mode. This is because when data values are written into the cache 22, they remain in the cache 22 until such time that they are flushed out to make room for new data, which may be a significant amount of time. If data were to be written to the frame buffer 24 by way of the cache 22, the data in the frame buffer 24 would become out of date with the data in the cache 22 due to the delay. This is called data incoherency, which may result in an incorrect image on the screen. In cache inhibited mode, in contrast, a memory access is completed by referencing the location in the frame buffer 24 using the GPRs 20 and the system bus 16, completely bypassing the cache 22.

Figure 3:
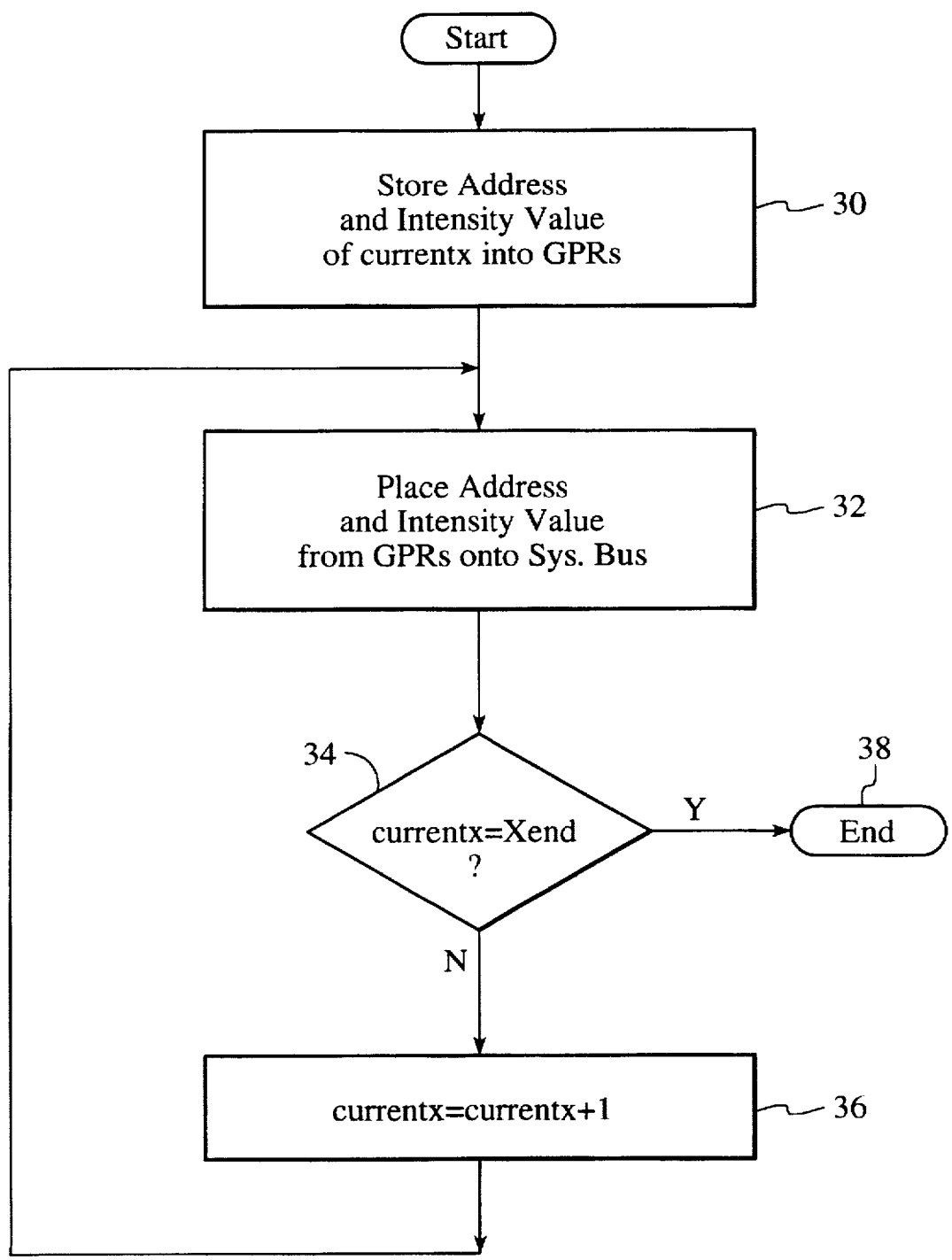
FIG. 3 is a flow chart depicting a conventional horizontal scan-converting process in which the frame buffer is cache-inhibited.

FIG. 3 is a flow chart depicting a conventional horizontal scan-converting process that writes one scan-line from the processor 12 into a cache-inhibited frame buffer 24. Referring to both FIGS. 1 and 3, the first step in the process is to write the address and intensity value of the current point in the scan-line, called currentx, into the GPRs 20 in step 30.

The address and intensity value stored in the GPRs 20 are placed on the system bus 16 in step 32. Placing the address/value pair on the system bus 16 sends the data to the frame buffer 24 where the intensity value is stored in the location specified.

After the address/value pair is sent to the frame buffer 24, currentx is checked to see if it is the last point in the scan-line in step 34. If currentx is not the last point, then currentx is set equal to the next point in the scan-line in step 36, and the process repeats by placing additional addresses and intensity values from the GPRs 20 onto the system bus 16. If currentx is the last point in the scan-line, then the process ends in step 38.

Figure 4:
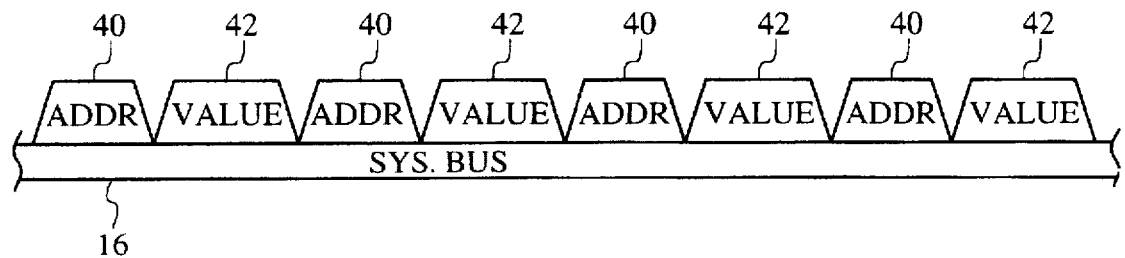
FIG. 4 is a pictorial representation graphically illustrating the utilization of the system bus during the conventional horizontal scan-conversion process of FIG. 3.

FIG. 4 is a block diagram graphically illustrating the utilization of the system bus 16 during the conventional horizontal scan-conversion process of FIG. 3. As shown, the conventional horizontal scan-conversion process stores a scan-line by sending one address 40 and one intensity value 42 over the system bus 16 for each point in the scan-line. Therefore, an address 40 is transferred over the system bus 16 every other bus cycle. With respect to intensity values, fifty percent of the system bus 16 capacity is wasted carrying addresses.

According to the present invention, the frame buffer 24 is placed in cached mode to improve system bus 16 utilization and data throughput to the frame buffer 24 during graphics operations. The present invention will be described in terms of horizontal scan-conversion. However, one of ordinary skill in the art will readily recognize that this method and system will operate effectively for other types of graphics operations which write to the frame buffer 24.

Figure 5:
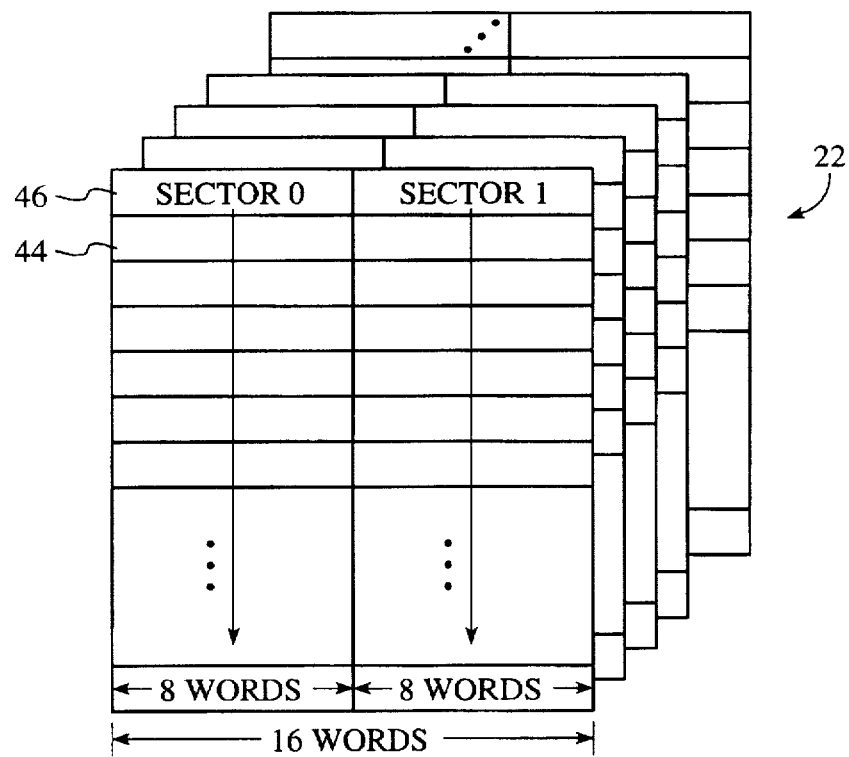
FIG. 5 is a pictorial representation depicting a cache as used in a preferred embodiment of the present invention.

Referring to FIG. 5, a block diagram of a cache is shown as used in a preferred embodiment of the present invention. The cache 22 is configured as eight sets of sixty-four cache-lines 44. A cache-line size is 64-bytes in length, and is divided into two eight-word sectors 46. The purpose of the cache-line 44 is to store data in the cache 22 and then to write the data into sequential locations the main memory 14. When a write command is issued for a particular cache-line 44, data is sent to the main memory 14 over the system bus 16 in burst mode. In burst mode, a starting memory address is placed on the system bus 16 followed by the eight data words that are stored in the cache-line 44.

According to the present invention, the frame buffer 24 is placed in cached mode during the scan-conversion process in order to utilize the burst mode of the system bus 16 to increase data throughput to the frame buffer 24.

Figure 6:
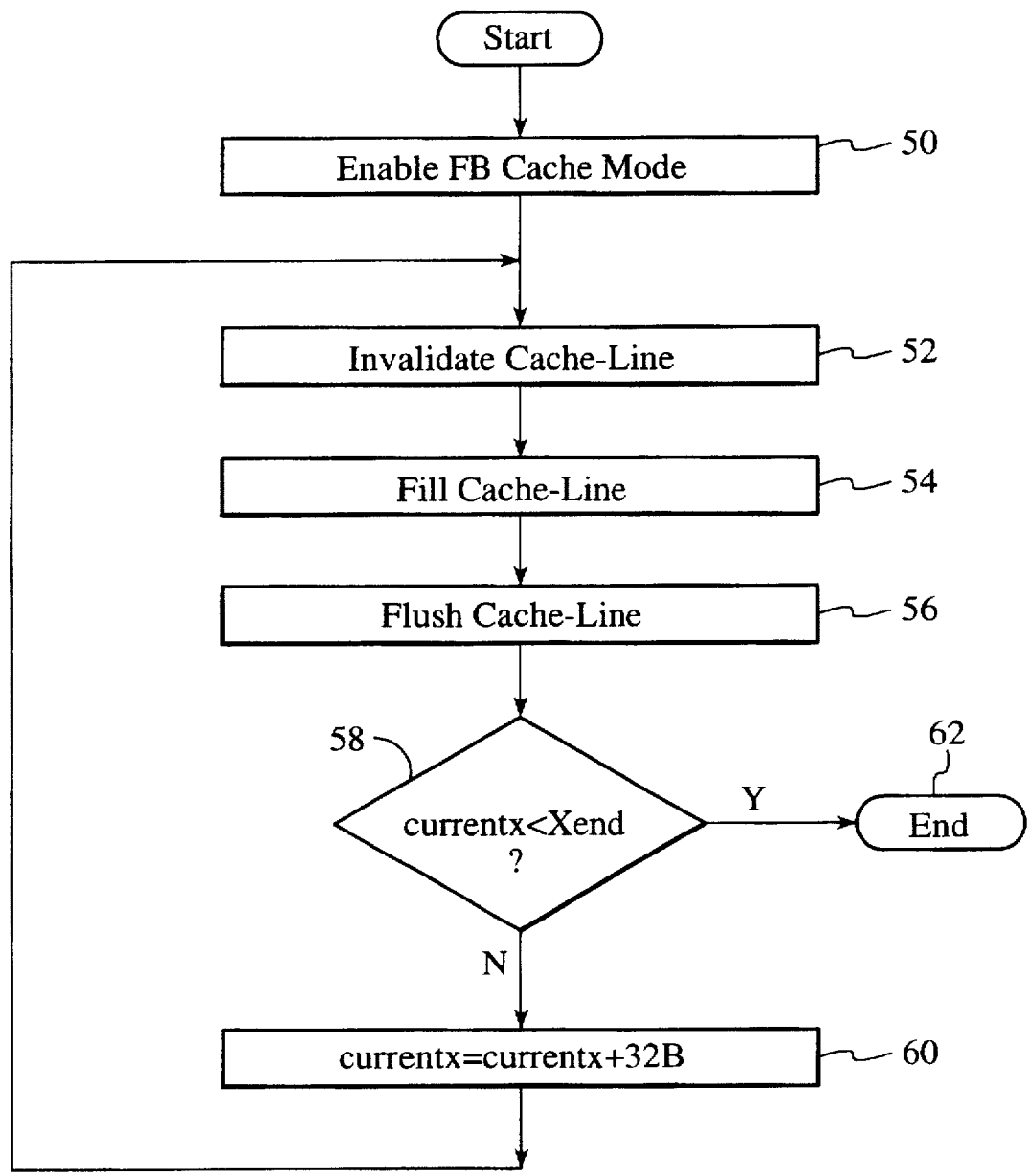
FIG. 6 is a flow chart depicting a scan-conversion process of the present invention in which the frame buffer is in cache enabled mode.

To more particularly illustrate the system and method of the present invention, refer to FIG. 6 depicting a flow chart of the scan-conversion process of the present invention. In a preferred embodiment of the present invention, the scan-conversion process is written in assembly language in order to manipulate individual cache-lines 44 of the PowerPC 601 RISC processor 12 manufactured by Motorola.

The first step of the process is to enable caching of the frame buffer 24 in step 50. In a preferred embodiment of the present invention, the frame buffer 24 is made cacheable by setting appropriate mode control bits that control access to the main memory 14. For example, if a mode control bit is used to place the frame buffer 24 in cache inhibited mode, then this mode control bit is set to the opposite value to enable cached mode.

Broadly speaking, the next step in the process is to fill a cache-line 44 with the intensity values of points in the scan-line. However, when a word is written to a cache-line 44 and the word is not already present in the cache-line 44, an attempt is made to transfer an additional 32-bytes from main memory 14 associated with that word into the cache-line 44. Therefore, the cache-line 44 into which the intensity value for the current point is to be written is invalidated in step 52. Invalidating a cache-line 44 prevents the cache 22 from reading the bytes associates with the word from memory into the cache-line 44, saving processing time.

A cache-line 44 is filled with the intensity values from the GPRs 20 for successive points in the scan-line in step 54. The intensity value of the current point, currentx, is the first intensity value to be placed in the cache-line 44. Since in a preferred embodiment, the cache-line 44 size is eight words, seven intensity values for points following currentx in the GPRs 20 are also written into the cache-line 44. If the cache-line 44 size is N words long, then a total of N intensity values are written from the GPRs into the cache-line 44.

Next, the contents of the cache-line 44 are explicitly flushed in step 56. When the cache-line 44 is flushed, the memory address of currentx is written to the system bus 16 followed by the N intensity values stored in the cache-line 44. Thus, the intensity values are transferred to the frame buffer in burst mode across the system bus.

According to the present invention, explicitly flushing the cache-line 44 is the operation that maintains data coherency between the frame buffer 24 and the cache 22. The data in the cache-line 44 is placed on the system bus 16 as soon as the cache-line 44 is filled, ensuring that the data written to the frame buffer 24 is current, rather than waiting until the cache-line 44 is naturally flushed by the cache 22.

After the address and the multiple intensity values are transferred to the frame buffer 24, currentx is checked to see if it is less than xend in step 58. If currentx is greater than xend, then currentx is incremented by 32-bytes in step 60, and the process repeats by invalidating the cache-line. Currentx is incremented by 32-bytes in order to skip over those points in the scan-line previously written to the frame buffer 24. If currentx is less than xend, then the process ends in step 62.

Figure 7:
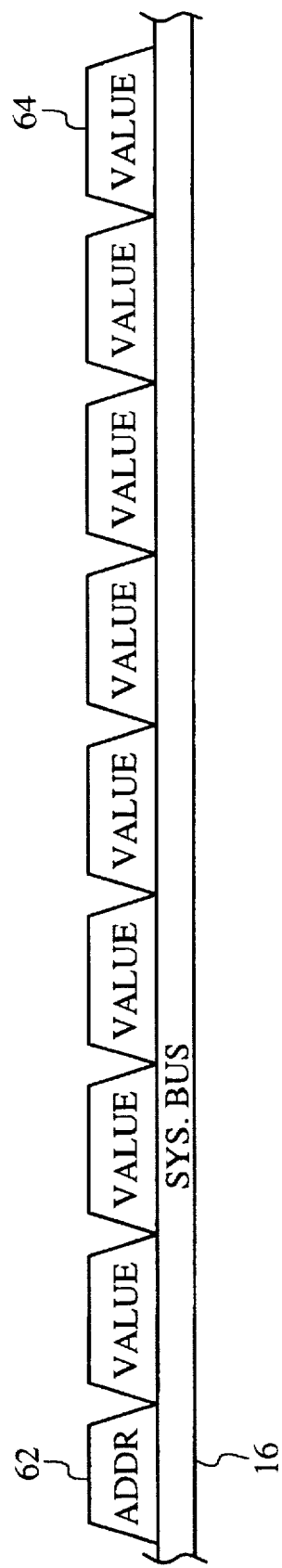
FIG. 7 is a pictorial representation graphically illustrating the utilization of the system bus in burst mode during the horizontal scan-conversion process of the present invention.

FIG. 7 is a block diagram graphically illustrating the utilization of the system bus 16 in burst mode during the horizontal scan-conversion process of the present invention. Using the frame buffer 24 in cached mode takes advantage of the burst mode of system bus 16 in which eight intensity values are placed on the system bus 16 following one address. As shown, a cacheable frame buffer 24 allows one address to be transferred over the system bus 16 every eighth bus cycle, instead of every other cycle as in traditional methods. Accordingly, the present invention increases frame buffer throughput by twenty-to-seventy percent.

A system and method has been disclosed that improves system bus 16 utilization and throughput to the frame buffer 24 by placing the frame buffer 24 in cached mode, and by flushing the cache-line 44 to maintaining data coherency. Software written according to the present invention is to be stored in some form of computer readable medium and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for increasing utilization of a system bus in a graphic display system in which a processor writes a plurality of data values into a first buffer at respective address locations, the processor including a cache having at least one cache-line, the method comprising the steps of:

(a) placing the first buffer in cached mode;
   (b) writing the plurality of data values into the at least one cache-line; and
   (c) flushing the at least one cache-line such that the plurality of data values are transferred from the cache to the first buffer, wherein data coherency is maintained and data throughput to the first buffer is increased.

2. A method as in claim 1 wherein step (a) further includes the step of:

(a1) invalidating the cache-line.

3. A method as in claim 2 wherein step (c) further includes the steps of:

(c1) placing a first address associated with a first one of the plurality of data values the bus; and
   (c2) placing the plurality of data values on the bus.

4. A method as in claim 3 wherein the plurality of data values are intensity values of pixels in a scan-line.

5. A method as in claim 4 wherein the at least one cache-line is N-bytes in length.

6. A method as in claim 5 wherein step (c) further includes the step of:

(c3) incrementing the first address by N-bytes to determine a starting location of a second plurality of data values in the scan-line.

7. A method as in claim 6 wherein the first buffer is a frame buffer.

8. A computer readable medium containing program instructions for increasing utilization of a system bus in a graphic display system in which a processor writes a plurality of data values into a first buffer at respective address locations, the processor including a cache having at least one cache-line, the program instructions for:

(a) placing the first buffer in cached mode;
   (b) writing the plurality of data values into the at least one cache-line; and
   (c) flushing the at least one cache-line such that the plurality of data values are transferred from the cache to the first buffer, wherein data coherency is maintained and data throughput to the first buffer is increased.

9. A computer readable medium as in claim 8 wherein instruction (a) further includes the instruction of:

(a1) invalidating the at least one cache-line.

10. A computer readable medium as in claim 9 wherein instruction (c) further includes the instructions of:

(c1) placing a first address associated with a first one of the plurality of data values the bus; and
   (c2) placing the plurality of data values on the bus.

11. A computer readable medium as in claim 10, wherein the plurality of data values are intensity values of pixels in a scan-line.

12. A computer readable medium as in claim 11 wherein the cache-line is N-bytes in length.

13. A computer readable medium as in claim 12 wherein instruction (c) further includes the instructions of:

(c3) incrementing the first address by N-bytes to determine a starting location of a second plurality of data values in the scan-line.

14. A computer readable medium as in claim 13 wherein the first buffer is a frame buffer.

15. A scan-conversion system including a processor, a bus, and a frame buffer, the processor for transferring a plurality of data values to the first buffer using the bus, the processor including a cache having at least one cache-line, the system comprising:

cache enable means for placing the frame buffer in cached mode;
   writing means for writing the plurality of data values into the at least one cache-line; and
   flush means for flushing the at least one cache-line onto the bus such that the plurality of data values are transferred from the cache to the frame buffer, wherein data coherency is maintained, and wherein bus utilization and data throughput to the frame buffer are increased.

16. A system as in claim 15 further including means responsive to the cache enable means for invalidating the cache-line.

17. A system as in claim 16 wherein the plurality of data values are stored in the first buffer at respective address locations, the writing means further including means for placing a first address associated with a first one of the plurality of data values on the bus followed by the plurality of data values.

18. A system as in claim 17 wherein the plurality of data values are intensity values of pixels in a scan-line.

19. A system as in claim 18 wherein the first buffer is a frame buffer.

20. A graphic display system, comprising:

a frame buffer;
   a processor coupled to the frame buffer, the processor including at least two general purpose registers, the two general purpose registers for storing a plurality of intensity values representing pixels, the plurality of intensity values having a starting memory address; and
   burst mode means for transferring the starting address followed by the plurality of intensity values to the frame buffer, whereby data throughput the frame buffer is increased.

21. A system as in claim 20 wherein the burst mode means includes:

a system bus;
   a cache; and
   a program for placing the frame buffer in cached mode.

22. A system as in claim 20 wherein the cache includes at least one cache-line and wherein the program fills the at least one cache-line with the plurality of intensity values and then flushes the cache-line.

* * * * *